United States Patent
Shimosaka et al.

(10) Patent No.: US 9,285,026 B2
(45) Date of Patent: Mar. 15, 2016

(54) DIFFERENTIAL GEAR CASE AND METHOD FOR PROCESSING SAME

(75) Inventors: Toshirou Shimosaka, Fuji (KE); Kiyohito Oyamada, Yokohama (JP); Shoichi Tetsuka, Oyama (JP); Makoto Imaida, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 521 days.

(21) Appl. No.: 13/576,321

(22) PCT Filed: Jan. 13, 2011

(86) PCT No.: PCT/JP2011/050437
§ 371 (c)(1),
(2), (4) Date: Jul. 31, 2012

(87) PCT Pub. No.: WO2011/096255
PCT Pub. Date: Aug. 11, 2011

(65) Prior Publication Data
US 2012/0304812 A1 Dec. 6, 2012

(30) Foreign Application Priority Data
Feb. 2, 2010 (JP) ................................. 2010-021248

(51) Int. Cl.
*F16H 57/02* (2012.01)
*F16H 48/08* (2006.01)
*F16H 48/40* (2012.01)

(52) U.S. Cl.
CPC ................. *F16H 48/08* (2013.01); *F16H 48/40* (2013.01); *Y10T 29/49826* (2015.01); *Y10T 74/2186* (2015.01)

(58) Field of Classification Search
CPC ......... F16H 48/00; F16H 48/38; F16H 48/40; F16H 2048/082; F16H 2048/085; F16H 2048/087; Y10T 74/2186; Y10T 74/2188; Y10T 74/2189
USPC .......... 74/89.13, 89.14, 606 R, 607; 475/230, 475/233, 248, 244, 231, 220
See application file for complete search history.

(56) References Cited

U.S. PATENT DOCUMENTS

2008/0004151 A1* 1/2008 Nakajima ..................... 475/233

FOREIGN PATENT DOCUMENTS

| EP | 1 767 817 A1 | 3/2007 |
| JP | 4-274928 A | 9/1992 |
| JP | 8-320059 A | 12/1996 |
| JP | 2008-275042 A | 11/2008 |
| JP | 2009-216154 A | 9/2009 |
| WO | WO 2005-080822 A2 | 9/2005 |

* cited by examiner

*Primary Examiner* — Richard W Ridley
*Assistant Examiner* — Yamilka Pinero Medina
(74) *Attorney, Agent, or Firm* — Foley & Lardner LLP

(57) ABSTRACT

A differential gear case is provided that includes a container housing of a differential gear, the container housing having on an outer surface thereof an annular flange that extends around an axis of rotation of the container housing, and one of two areas of the container housing that are separated by the annular flange being formed with an opening that is communicated with a containing space formed in the container housing. The area of the container housing that is formed with the opening is provided with a fixing portion used for fixing the differential gear case. The fixing portion includes two flat surfaces that are in parallel with a plane surface containing the axis of rotation of the container housing and arranged around the axis of rotation keeping a space therebetween.

3 Claims, 7 Drawing Sheets

DIFFERENTIAL GEAR CASE AND METHOD FOR PROCESSING SAME

TECHNICAL FIELD

The present invention relates to a differential gear case that installs therein a differential gear to carry out a power distribution in a power transmission system and serves as part of a power transmission member.

BACKGROUND ART

One of conventional differential gear cases (which will be called "differential case" in the following) is a container housing (see the case in Patent Document 1, for example) that contains therein a differential gear and has on an outer surface thereof an annular flange that extends around an axis of rotation of the container housing and has, on one of two areas of the outer surface of the container housing that are bordered by the annular flange, a plurality of reinforcing ribs that radially outward extend from the axis of rotation of the container housing.

PRIOR ART DOCUMENT

Patent Document

Patent Document 1: Japanese Laid-open Patent Application (Tokkaihei) 4-274928

SUMMARY OF INVENTION

In differential cases of the type as mentioned hereinabove, the other area of the container housing, that is opposite to the area with the reinforcing ribs with respect to the annular flange, is formed with an opening that is exposed to a containing space of the differential case, so that work for assembling the differential gear as well as work for machining an inside wall of the differential case are carried out through the opening. Accordingly, the reinforcing ribs are used as not only means for increasing a mechanical strength of the differential case but also means for providing a fixing portion at the time when processing of the differential case is needed.

In the above-mentioned differential cases, at the time of assembling the differential gear, a high precision assembling work has been needed, and at the time of applying an after-processing, such as machining and the like, to the inside surface of the differential case, a high precision machining work has been needed. However, in the above-mentioned known differential cases, it has been realized that there is still room for improvement.

That is, in case of casting a differential case by using a split die, the area with the opening is produced by one die (viz., main die), and the other area with the reinforcing ribs, that is opposite to the opening-possessed area with respect to the flange, is produced by the other die (viz., upper die). For casting, these two dies are coupled together along an axis of rotation of the differential case having respective flanged ends mated thereby to form a cavity (viz., shaping space) therebetween, and then a core is put into the shaping space for carrying out an integral casting of an entire construction of the differential case.

However, upon coupling of the two dies, it tends to occur that the upper and main dies show a relative displacement between respective mating surfaces thereof about the axis of rotation of the differential case. It has been realized that the relative displacement between the mating surfaces of the upper and main dies is caused by the position of the opening of the differential case about the axis of rotation upon fixing of the differential case by using the reinforcing ribs, which position shows a relative displacement between an architectonic angular position of the opening about the axis of rotation and an angular position of the opening of the produced differential case about the axis of rotation of the differential case.

Thus, according to the present invention, there is provided a differential case in which an outer surface of a container housing for a differential gear is formed with an annular flange that extends around an axis of rotation of the container housing and one of two areas of the container housing that has the two areas at opposite sides of the flange is formed with an opening exposed to a containing space formed in the container housing, which is characterized in that the area of the container housing where the opening is provided is provided with a fixing portion that is used for fixing the differential case.

A modification is possible in which the fixing portion comprises two flat surfaces that are in parallel with a plane surface containing the axis of rotation of the container housing and are arranged around the axis of rotation keeping a space therebetween.

Another modification is possible in which the fixing portion is provided in the vicinity of a peripheral portion of the area where the opening is provided and in the vicinity of an outside of an outside edge portion that faces the flange.

A further modification is possible in which the fixing portion constitutes a common plane surface together with an edge portion that defines the opening.

EMBODIMENTS FOR EMBODYING THE INVENTION

Figure 1:
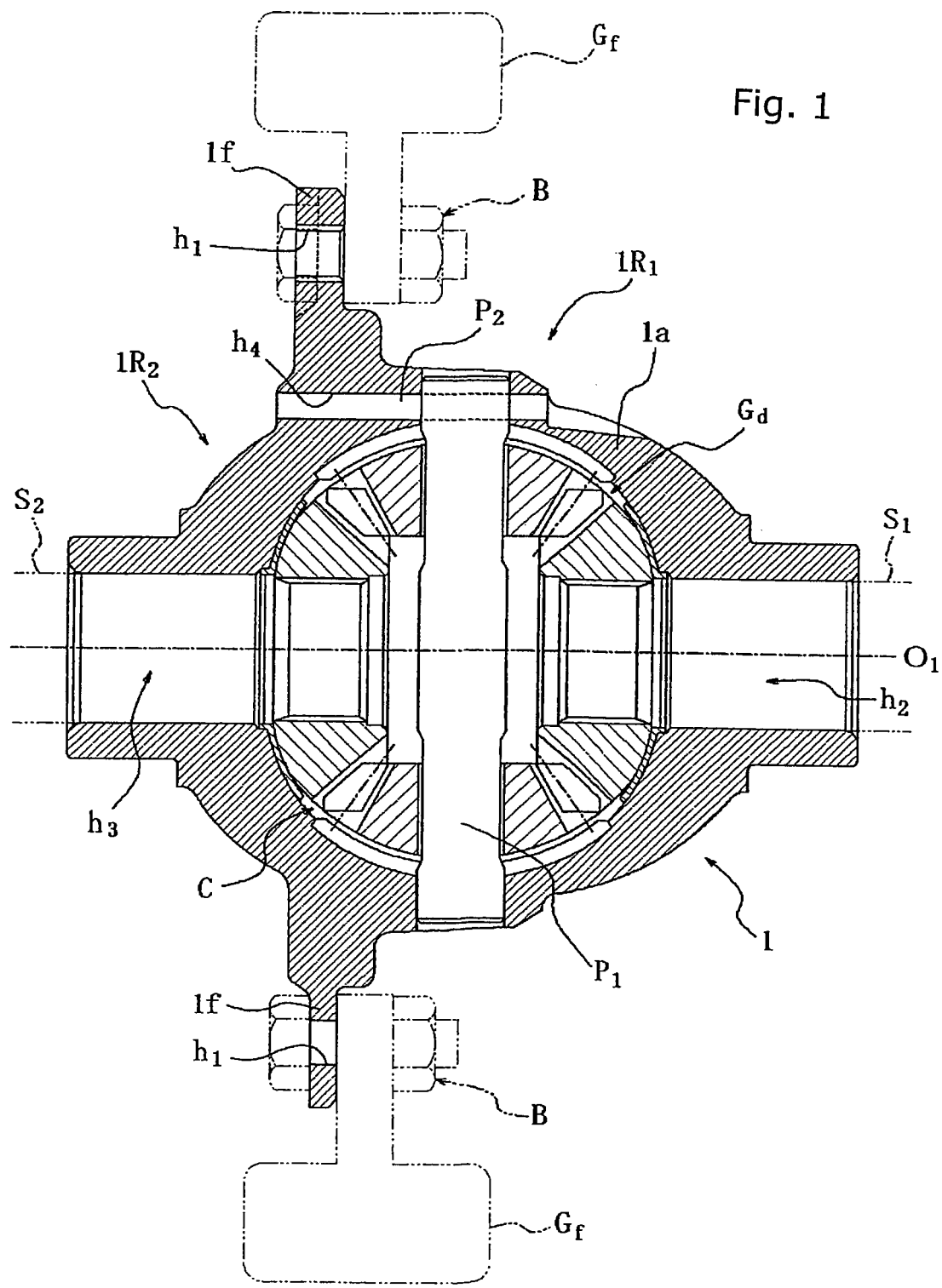
FIG. 1 is a vertically sectional view of a differential case of a first embodiment of the present invention in a condition wherein the differential case has been subjected to an after-processing.

A differential case of the present invention which will be described in the following is produced by coupling two dies around an axis of the case at respective mating surfaces of the dies in a manner to form a flange of the case at and by the respective mating surfaces, so that the differential case thus produced has an opening-possessed area and the other area that are positioned at opposite sides with respect to the flange. However, if the opening-possessed area and the other area thus produced show a mutual displacement therebetween about the axis of the case, the work for assembling a differential gear and machining an inside wall of the case becomes difficult. Paying attention to the above, in the present invention, an opening-possessed area of a container housing is provided with a fixing portion that is used for fixing the differential gear case and by positioning the opening-possessed area per se, the undesired effect caused by the mutual displacement about the axis of rotation is suppressed. That is, in the present invention, since the opening-possessed area can be fixed to a right position that is desired when the differential case is fixed, the differential gear can be assembled with high precision. Furthermore, even when machining of the inside wall of the differential gear case and drilling of the flange for fixing a final drive ring gear thereto are carried out, the case is suppressed from receiving vibration and thus, finishing processing of the differential gear case can be easily made with high precision.

Thus, in the present invention, the differential gear can be easily assembled with high precision and the inside wall of the opened portion can be easily machined with high precision.

Besides, in the present invention, when fixing the differential case is needed, there is no need of fixing the other area with the aid of the reinforcing ribs provided on the other area where the opening is not provided like in the conventional case. Accordingly, when it is revealed that the reinforcing ribs can be removed because of resolution of problems in strength, it is possible to lighten and miniaturize the differential case by omitting the reinforcing ribs. Particularly, miniaturization of the differential case can bring about improvement in layout of a power transmission system because of attainment of space saving.

In the following, a differential gear case (which will be called "differential case" in the following) of the present invention will be described in detail with reference to the drawings.

A differential case 1 has a container housing is that has therein a container space C for containing a differential gear $G_d$, and an outer surface of container housing is integrally formed with an annular flange 1$f$ that extends around an axis $O_1$ of rotation (which will be called "axis" in the following) of container housing 1$a$. To flange 1$f$, there is connected a final drive gear $G_f$ through a plurality of bolts B. Thus, flange 1$f$ is formed with a plurality of bolt holes (threaded holes) $h_1$.

While, container space C is communicated with the outside through holes h2 and h3 that extend in leftward and rightward directions along the axis $O_1$. Into the respective through holes $h_2$ and $h_3$, there are inserted axles $S_1$ and $S_2$ (shown by a two-dot chain line in FIG. 1) that are connected to differential gear $G_d$ and rotatable about the axis O1.

With the aid of a differential pin $P_1$, differential gear Gd is arranged to rotate together with differential case 1 about the axis $O_1$. Designated by $P_2$ in FIG. 1 is a pin member that passes through a through hole $h_4$ formed in differential case 1 to fix differential pin $P_1$.

With the above-mentioned arrangement, differential case 1 serves as a part of a power transmission member by rotating about the axis $O_1$, and at the same time, differential gear $G_d$ installed in the case functions to distribute a power from an automatic transmission (not sown) mounted on an associated motor vehicle to left and right road wheels (not shown) through left and right axles S1 and S2.

Figure 2:
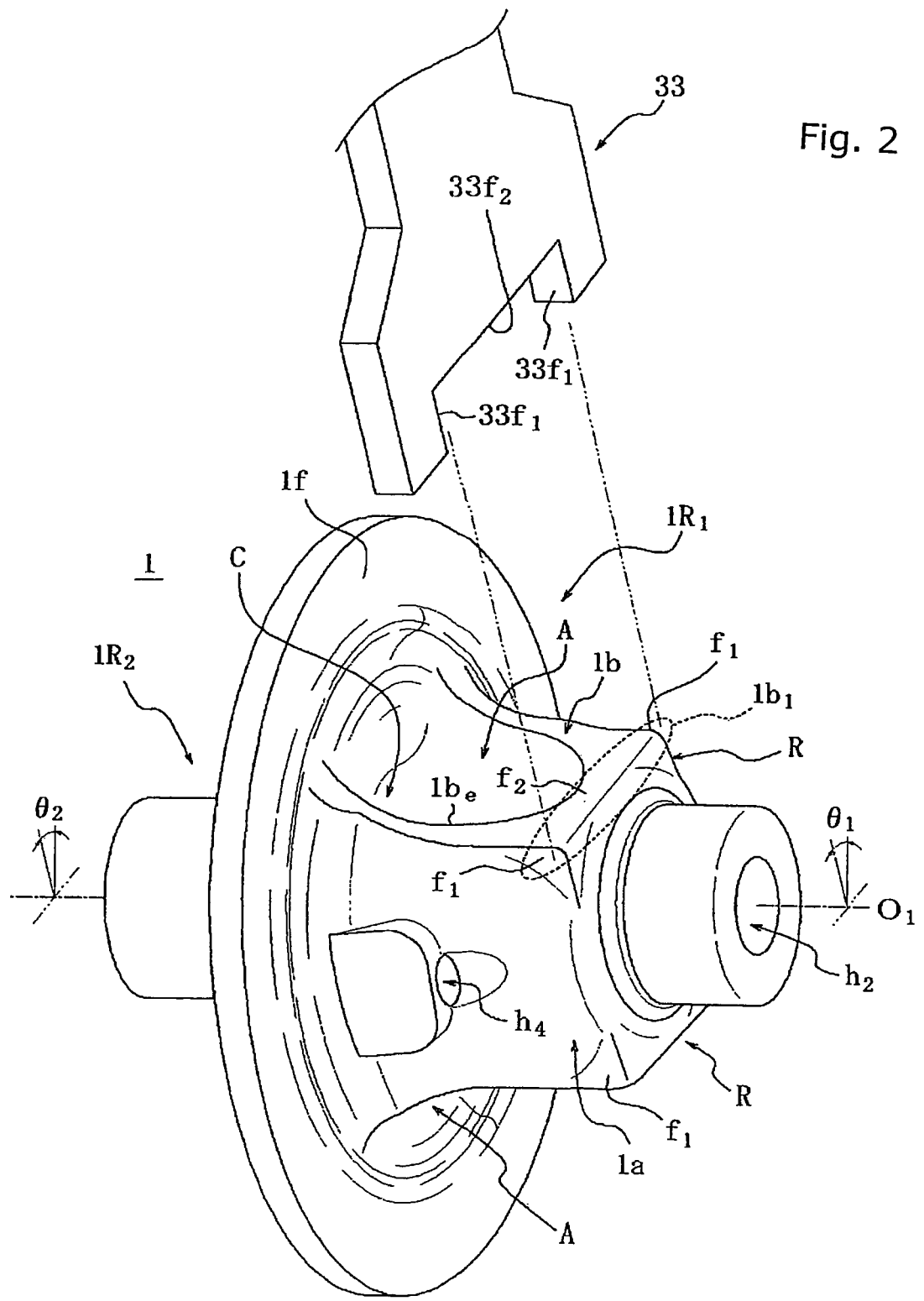
FIG. 2 is a schematically illustrated perspective view of the differential case of the first embodiment in a condition wherein the differential case has not been subjected to the after-processing yet.

As is seen from FIG. 2, container housing 1$a$ of differential case 1 is formed, at one (viz., a side area of left axle $S_1$ in the illustrated embodiment) 1$R_1$ of two areas that extend along the axis $O_1$ and are separated by flange 1$f$, with two openings A that are communicated with container space C. As is seen from FIG. 1, the one area 1$R_1$ (which will be called "open side area" in the following) has an occupying area larger than that of the other area 1$R_2$ (which will be called "closed side area" in the following) that is provided at an opposite side of the area 1$R_1$ with respect to flange 1$f$, and the two openings A are provided at opposite positions with respect to the axis $O_1$.

As is seen from FIG. 2, openings A are provided by differential case 1 beforehand prior to making the after-processing. For example, differential case 1 of the embodiment is produced by setting a core in a cavity defined between mating surfaces of movable and fixed dies and filling the cavity with a molten material.

As is seen from FIG. 2, an edge portion 1$b$ bordering each opening A has, at an outside edge portion 1$b_1$ of a side that faces flange 1$f$, a fixing portion R that is integral with edge portion 1$b$. Fixing portion R has two side surfaces $f_1$ that are in parallel with a plane surface containing the axis $O_1$ and spaced from each other around the axis $O_1$.

As is seen from FIG. 2, between the two side surfaces f1, there extends an upper end surface $f_2$ that has the same flat surface as outside edge portion 1$b_1$. That is, as is seen from FIG. 3, each fixing portion R has a rectangular cross section that includes two side surfaces $f_1$ and upper end surface $f_2$ that extends between two side surfaces $f_1$. While, as is seen from FIG. 2, a fixing member 33 has inside surfaces 33$f_1$ and 33$f_2$ that are constructed be brought into contact with side surfaces $f_1$ and upper end surface $f_2$ of fixing portion R thereby to tightly hold the entire construction of fixing portion R, as is seen from FIG. 3.

Figure 3:
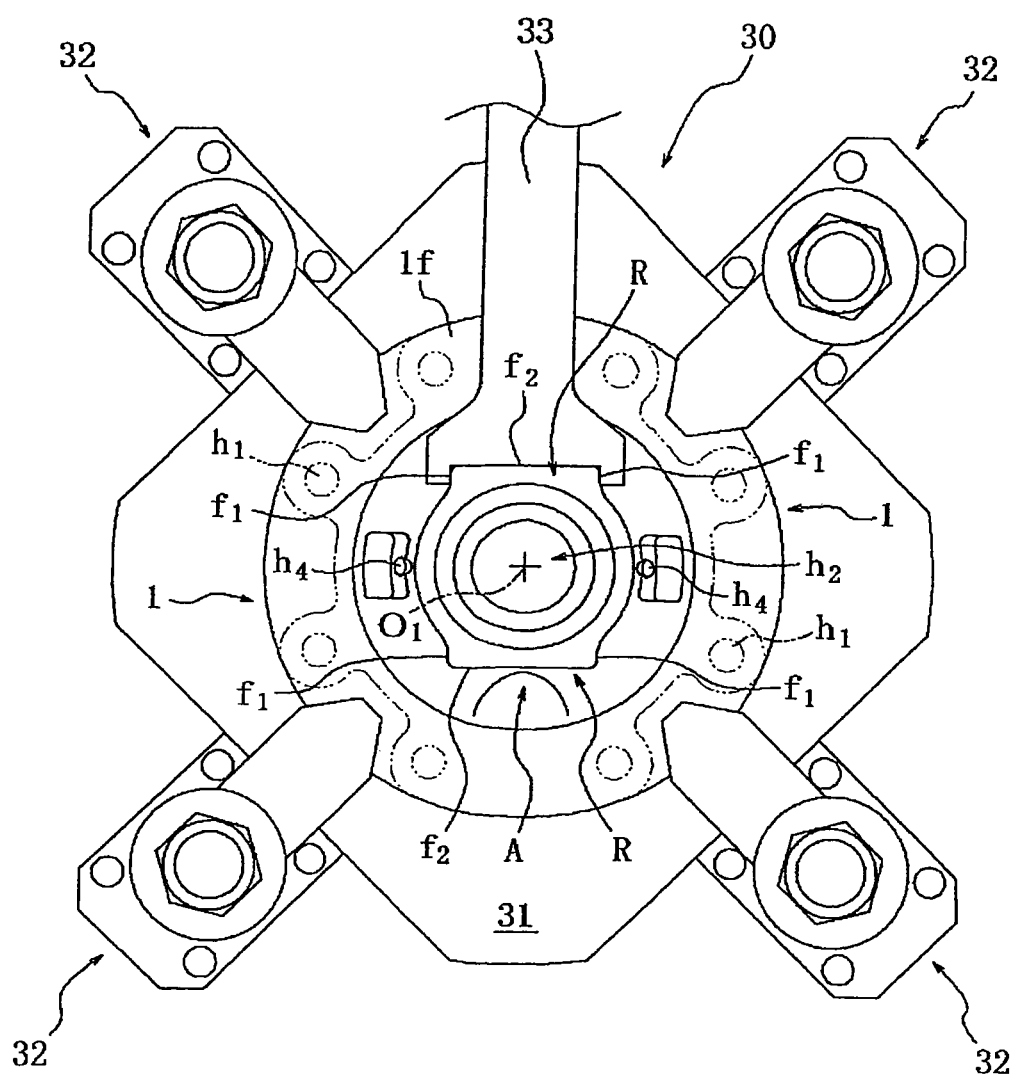
FIG. 3 is a schematically illustrated plan view of the differential case of FIG. 2 in a condition wherein for carrying out the after-processing, the case is fixed to a machine tool.

Thus, as is seen from FIG. 3, when flange 1$f$ is fitted through four clamp devices 32 to a fixing board 31 installed in a machine tool 30, differential case 1 can be fixed in machine tool 30, and due to fitting of fixing member 33 to fixing portion R, differential case 1 can be positioned around the axis $O_1$.

In this embodiment, openings A formed in differential case 1 are those that are practically used when differential gear $G_d$ is assembled or the inside wall of the case 1 is machined. However, in case of producing differential case 1 via die cast method, the open side area 1$R_1$ is shaped by one (viz., main die) of paired dies and the closed side area 1$R_2$ is shaped by the other (viz., upper die) of the paired dies, and these two dies are coupled on the axis $O_1$ of rotation of differential case 1 having respective end surfaces for flange 1$f$ thereof mated thereby to form a cavity (viz., shaping space) therebetween, and then a core is put into the shaping space for carrying out an integral casting of an entire construction of the differential case 1.

Thus, if, in the past, the upper and main dies showed a relative displacement (viz., a difference between $\theta_1$ and angle $\theta_2$) therebetween at mutually mating surfaces thereof about the axis $O_1$ of rotation of differential case 1, fixing the closed side area 1$R_2$ (viz., the area where reinforcing ribs 10$r$ are provided in a conventional one) caused a certain displacement of the position of the openings A by a degree corresponding to the above-mentioned difference, and thus, the work for assembling differential gear $G_d$ and machining the inside wall of differential case 1 tended to be difficult.

Thus, in the invention, as is described hereinabove, the open side area 1$R_1$ that has the openings A formed therein has a fixing portion R used for fixing differential case 1 and, by positioning the openings A of their self, displacement of the closed side area 1$R_1$ relative to the closed side area 1$R_2$ around the axis $O_1$ of rotation is suppressed. That is, in the invention, since the position of the openings A is fixed to just the position where differential case 1 is fixed, upon assembly, it is possible to carry out the assembling work for differential gear $G_d$ with high precision. Furthermore, since vibration that would be produced when machining the inside wall of differential case 1 through the openings A and providing flange 1$f$ with bolt holes $h_1$ by drilling can be suppressed, finishing processing of differential case 1 can be made with high precision.

Accordingly, in differential case 1 of the embodiment, differential gear $G_d$ can be easily assembled with high precision. Furthermore, the inside wall of the openings A can be easily machined with high precision. Two causes have been considered as a reason for the relative displacement between the upper and main dies, one being a cause in which the displacement is produced when the two dies are coupled, and the other being a cause in which the displacement is produced when, after pouring molten material, such as melted iron or the like into the cavity, a produced case is released from the casting dies.

Figure 6:
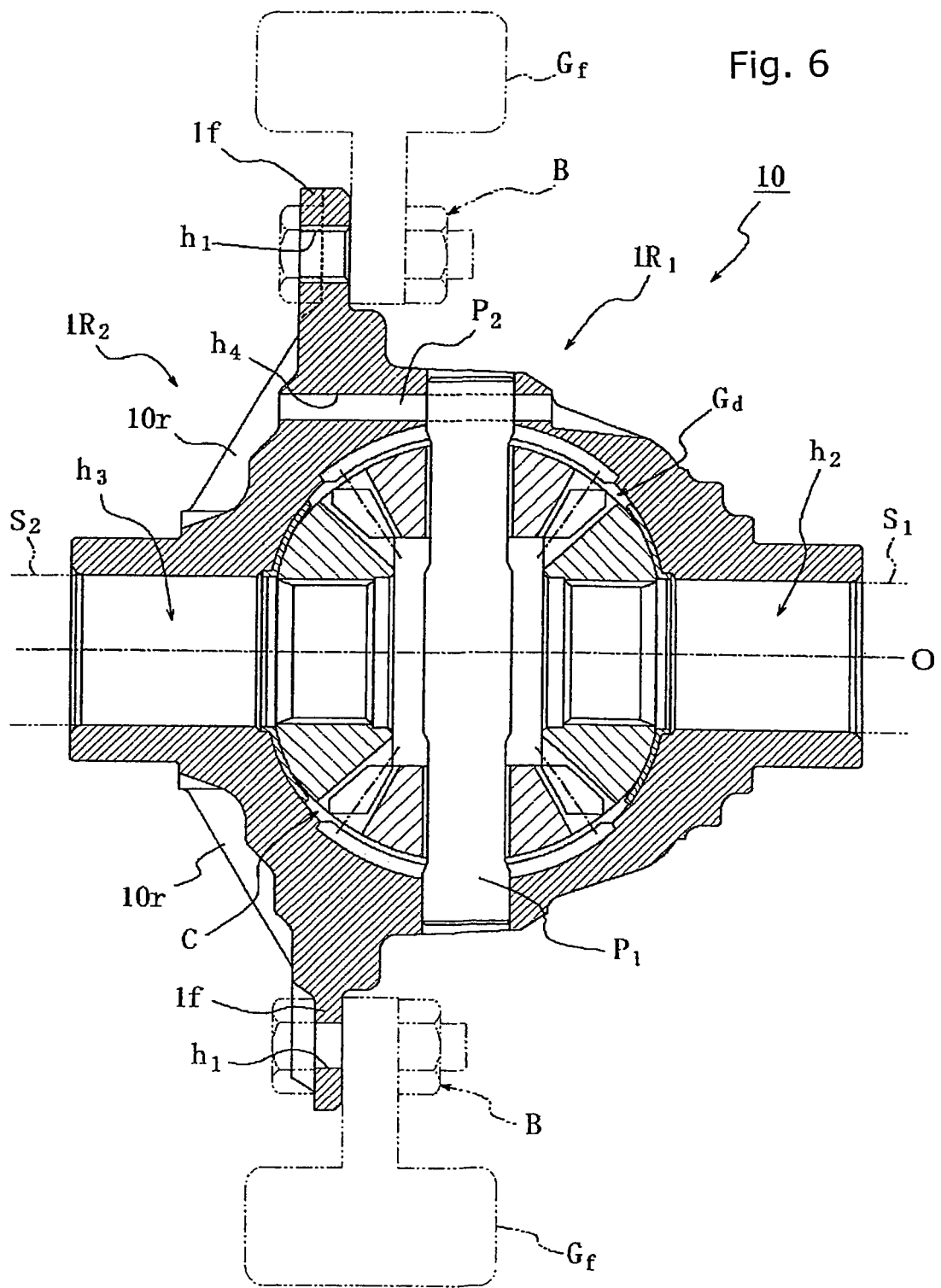
FIG. 6 is a vertically sectional view of a conventional differential case in a condition wherein the case has been subjected to the after-processing.
Figure 7:
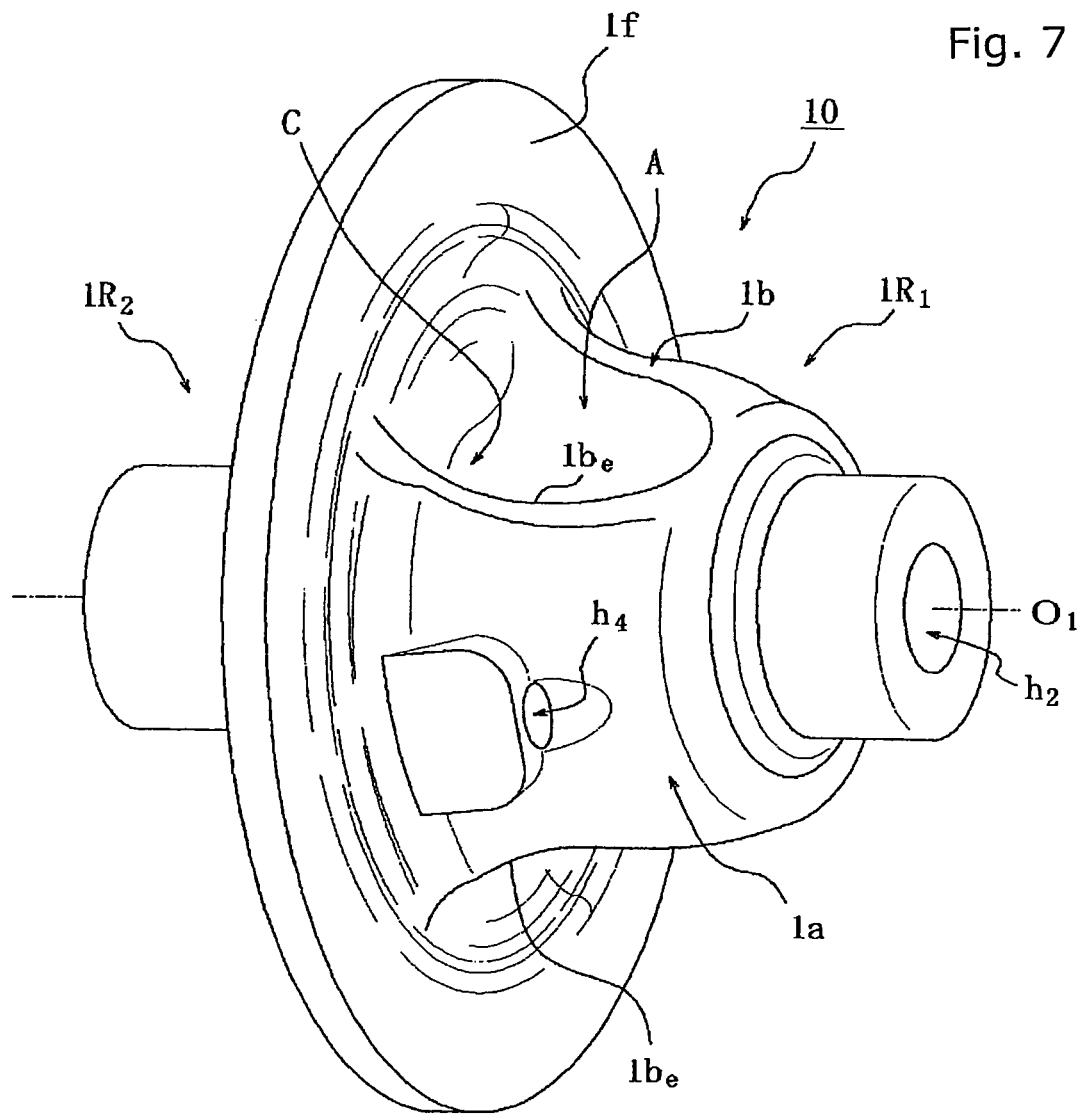
FIG. 7 is a schematically illustrated perspective view of the case of FIG. 6 in a condition wherein the case has not been subjected to the after-processing yet.

In the embodiment of the invention, there is no need of effecting the fixing by the reinforcing ribs 10$r$ (see FIG. 6) formed on the container housing 1$a$, like in the conventional difference case 10 shown in FIGS. 6 and 7. Accordingly, if omission of reinforcing ribs 10$r$ is permitted due to solution of apprehension for its mechanical strength, it becomes possible to lighten and miniaturize differential case 1 by omitting the reinforcing ribs 10$r$. Particularly, miniaturization of differential case 1 induced by omission of reinforcing ribs 10$r$ brings about improvement in space saving and thus, layout of a power transmission system, such as automatic transmission or the like, is improved.

Furthermore, like in the embodiment, if the fixing portion R is shaped to have two side surfaces $f_1$ that are in parallel with a plane surfacing containing the axis $O_1$ and spaced from each other around the axis $O_1$, the differential case can be fixed from various directions around the axis $O_1$ of container housing 1$a$ by using fixing member 33 even if the position of fixing portion R is changed in container housing 1$a$ or any shape is selected as the upper end surface $f_2$. That is, because of such construction, by providing the fixing position of differential case 1 with freedom, it is possible to provide a differential case that is widely applicable to various devices and assures increase in assembling precision and machining precision of differential gear $G_d$.

The outside neighboring part, which faces flange 1$f$, of the outside edge portion 1$b_1$ of the edge portion 1$b$ that defines openings A formed in container housing is a portion where stress tends to be concentrated during power transmission operation. Thus, if, like in the invention, fixing portion R is constructed to be integral with outside edge portion 1$b_1$ of the side facing flange in the neighboring area of edge portion 1$b$ that defines openings A, container housing 1$a$ can be reinforced by increasing the thickness of the portion where the stress is to be concentrated, and thus, it is possible to provide a differential case 1 that has an increased durability and assures increase in assembling precision and machining precision of differential gear $G_d$.

In case of producing differential case 1 via die cast method, a ridge portion (viz., inside ridge portion) 1$b_e$ that forms a corner part of the inside of the openings A that is part of edge portion 1$b$ forming openings A tends to have burrs. However, in the embodiment, fixing portion R is constructed to have a common flat surface together with outside edge portion 1$b_1$ that defines openings A, and thus, the holding and fixing of it are assured at a portion that does not interfere with the ridge portion 1$b_e$ of the upper end surface $f_2$ of fixing portion R. In addition to this, by increasing the thickness of the area that is to be reinforced against the concentrated stress, it is possible to provide a differential case 1 that has an increased durability and assures increases in assembling precision and machining precision of differential gear $G_d$.

In accordance with the invention, as is mentioned hereinabove, as the fixing portion R, it is possible to employ a construction that has two side surfaces $f_1$ that are in parallel with a plane surface containing the axis $O_1$ and spaced from each other around the axis $O_1$. Thus, the fixing portion R according to the invention can be placed in the vicinity of the edge portion 1$b$ that defines each opening A and in the vicinity of the outside edge portion 1$b_1$ that defines the opening A.

Figure 4:
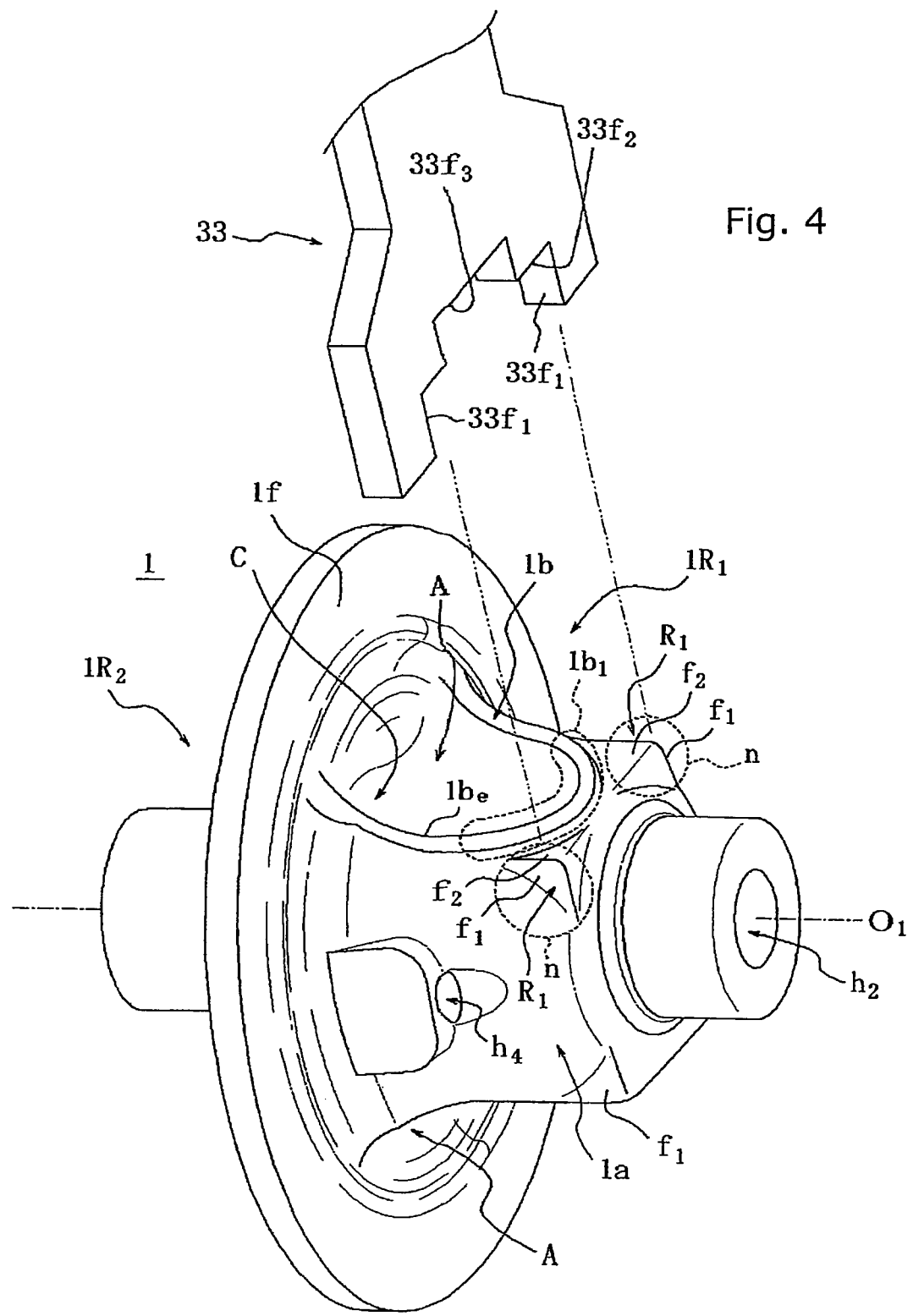
FIG. 4 is a schematically illustrated perspective view of a differential case of a second embodiment of the present invention in a condition wherein the case has not been subjected to the after-processing yet.

Thus, in accordance with the present invention, an embodiment shown in FIG. 4 may be provided. That is, in the embodiment, as is seen from the drawing, the fixing portion R comprises two flat raised portions R1 that are placed in the vicinity of the edge portion 1$b$ that defines openings A and placed at outside areas n of the outside edge portion 1$b_1$ that faces flange 1$f$.

In this embodiment, as fixing member 33, a tool having a shape as shown in FIG. 4 is used. In this case, because of contact between inside surfaces 33$f_1$ to 33$f_3$ of the fixing member and side surfaces $f_1$ and upper end surfaces $f_2$ that are formed on flat raised portions R1 and the outside edge portion 1$b_1$, an entire construction of the two flat raised portions R1 can be tightly held by fixing member 33. With this, differential case 1 of this embodiment can be angularly positioned relative to the axis $O_1$ by the engagement between fixing member 33 and fixing portion R that includes two flat raised portions R1.

In the present invention, as is mentioned hereinabove, it is only necessary for fixing member 33 to grasp at least two side surfaces $f_1$. Although, in the above-mentioned embodiments, fixing portion R is tightly fixed by contacting at least the inside surfaces 33$f_1$ of fixing member 33 with the two side surfaces $f_1$ in a direction perpendicular to the axis $O_1$, a matter as to whether the mutual contacting should be made in the direction perpendicular to the axis $O_1$ or not is made at will, and it is also possible to achieve the tight fixing of the fixing portion R by contacting the inside surfaces 33$f_1$ of fixing member 33 with the two side surfaces $f_1$ in a direction parallel with the axis $O_1$. Furthermore, a matter as to whether the inside surfaces 33$f_2$ and inside surfaces 33$f_3$ of fixing member 33 should contact with the upper end surface $f_2$ and outside edge portion 1$b_1$ of fixing portion R is freely made at will.

In differential case 1 formed with fixing portion R according to the invention, the following method is usable for drilling the case.

FIGS. 5($a$) to 5($e$) are schematic views showing, in a time order, steps of a drilling process of a machine tool 30 applied to flange 1$f$.

In order to drill holes in flange 1$f$, a first step is carried out wherein as shown in FIG. 5($a$), differential case 1 is put into the machine tool 30.

Then, a second step is carried out wherein as shown in FIG. 5($b$), centering of the case is made by using centering shafts 34$a$ and 34$b$ possessed by machine tool 30. The centering is carried out by, for example, rotatably inserting centering shafts 34$a$ and 34$b$ into through holes $h_2$ and $h_3$ of differential case 1. With this step, differential case 1 becomes positioned relative to the axis $O_1$ in a manner to be rotatable about the axis $O_1$.

As shown in FIG. 5($c$), in a third step, with usage of fixing member 33, differential case 1 is fixed in a manner not to rotate about the axis $O_1$. As is mentioned hereinabove, fixing member 33 is tightly engaged with fixing portion R for effecting fixing of differential case 1. With this step, differential case 1 is angularly positioned about the axis $O_1$ (axis of rotation).

That is, by carrying out the first to third steps, differential case 1 can be positioned in X, Y and Z directions in machine tool 30.

Figure 5A:
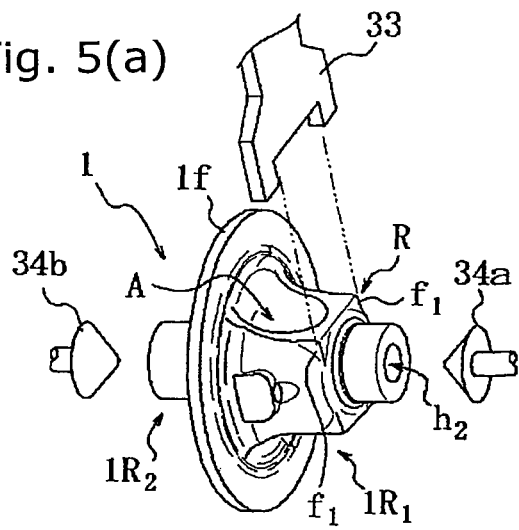
FIGS. 5(*a*) to 5(*e*) are sequentially arranged schematic views of a differential case of which flange is being subjected to a drilling process.
Figure 5B:
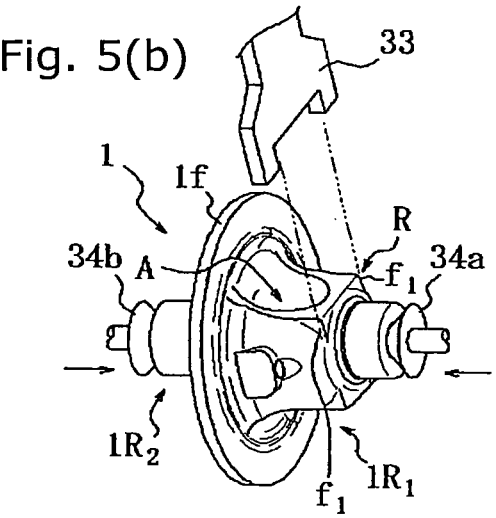
Figure 5C:
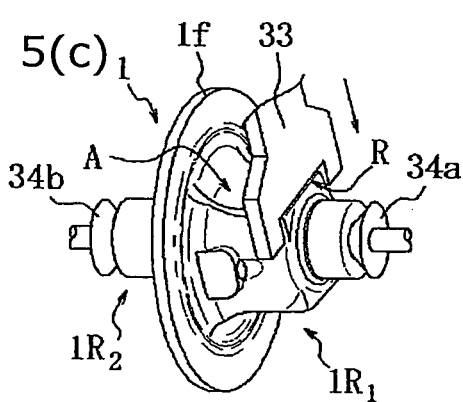
Figure 5D:
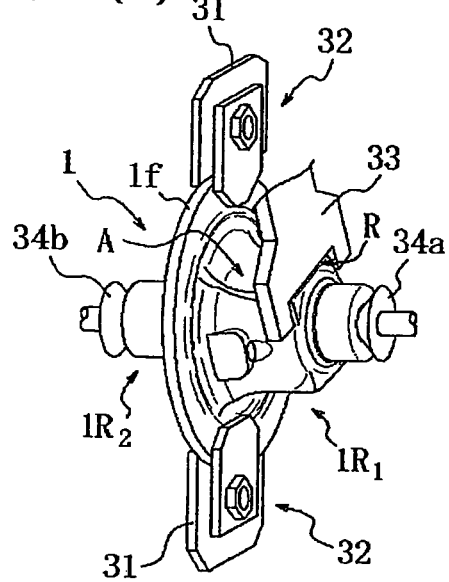

Then, as is seen from FIG. 5(d), in a fourth step, by using clamp devices 32, differential case 1 is much strongly fixed. As is mentioned hereinabove, by pressing flange 1f against fixing boards 31 by clamp devices 32, differential case 1 can be fitted to machine tool 30 without backlash. Thus, undesired play of differential case 1, which would occur under drilling, is suppressed.

Figure 5E:
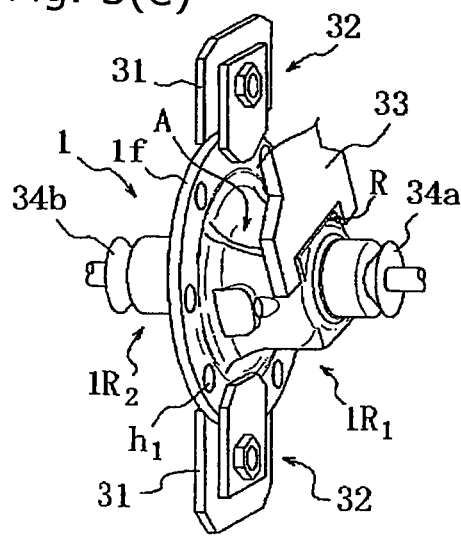

As is seen from FIG. 5(e), in a fifth step, drilling process is applied to flange 1f by using a drilling tool. With this drilling process, flange 1f has a plurality of bolt holes $h_1$ formed therethrough. If desired, bolt holes $h_1$ may be threaded by using taps.

Furthermore, in the present invention, as the fifth step, in addition to the drilling process, machining may be applied to an outer surface of differential case 1 holding the case in machine tool 30. In this embodiment, by applying machining to flange 1f, flange 1f may have such an external appearance that bolt holes $h_1$ are fringed, as is indicated by a two-dot chain line in FIG. 3.

Furthermore, in case of installing differential gear $G_d$ in differential case 1, the same effects as those mentioned hereinabove are obtained. That is, when fixing portion R provided on the open side area $1R_1$ is practically used in case of installing differential gear $G_d$ to differential case 1, installing of differential gear $G_d$ in the case can be realized with high precision.

It is to be noted that FIGS. 6 and 7 show respectively a conventional differential case 10 that has been subjected to an after-processing and a conventional differential case 10 that has not been subjected to the after-processing. As is seen from FIG. 6, conventional differential case 10 has, on a closed side area $1R_2$ directed toward openings A having flange 1f placed therebetween, a plurality of reinforcing ribs 10r that are arranged about the axis $O_1$. By using these reinforcing ribs 10r as the fixing portion, differential case 10 is angularly positioned relative to the axis O.

That is, in a zone including the open side area $1R_1$ and closed side area $1R_2$ that are separated by flange 1f, the fixing of the above-mentioned differential case 10 is made by the smaller closed side area $1R_2$ of which occupying rate to the entire area of container housing 1a is small.

Accordingly, if differential case 10 is not stably fixed, it tends to occur that a high precise installing of differential gear $G_d$ is not achieved at the time when differential gear $G_d$ is intended to be installed in the case. Furthermore, in case of effecting an after-processing, such as machining or the like, to differential case 10, the case is directed affected by vibration that is inevitably produced, and thus, such after-processing can stand further improvement in processing accuracy. Furthermore, since the reinforcing ribs 10r are used as the fixing portion, there is still room for improvement in weight saving and miniaturization.

Although the above-mentioned embodiments are those that show the best modes of the invention, various changes may be made to them in a scope of Claims. For example, although, in the above-mentioned embodiments, the fixing is carried out by using only one of the two fixing portions R, the fixing can be made by using both the two fixing portions R according to the invention. Furthermore, the fixing portion R may be provided on at least one portion. Furthermore, in accordance with the present invention, the components used for the above-mentioned embodiments can be suitably combined with one another depending on the situation.

INDUSTRIAL UTILIZATION

The present invention is not limited to parts for motor vehicle, and is applicable to parts of various power transmission systems so long as the systems are those that use a differential gear.

The invention claimed is:

1. A differential gear case comprising:
a container housing of a differential gear, the container housing having on an outer surface thereof an annular flange that extends around an axis of rotation of the container housing, and one of two areas of the container housing that are separated by the annular flange being formed with an opening that is communicated with a containing space formed in the container housing,
in which:
the area of the container housing that is formed with the opening is provided with a fixing portion that is used for fixing the differential gear case, and
the fixing portion comprises two flat surfaces that are in parallel with a plane surface containing the axis of rotation of the container housing and arranged around the axis of rotation keeping a space therebetween,
wherein an edge portion bordering the opening has, at an outside edge portion of a side that substantially parallels the annular flange, the fixing portion that is integral with the edge portion, and wherein the fixing portion has a rectangular cross section that includes the two flat surfaces and a flat upper end surface that extends between the two flat surfaces; and in which the fixing portion includes two flat raised portions, each arranged at outside ends of the outside edge portion and integral with the two flat surfaces.

2. A differential gear case as claimed in claim 1, in which the fixing portion is arranged at an outside of the outside edge portion.

3. A differential gear case as claimed in claim 2, in which the fixing portion has a common flat surface with the edge portion, the common flat surface being the flat upper end surface.

* * * * *